United States Patent
Kim et al.

(10) Patent No.: US 7,822,144 B2
(45) Date of Patent: Oct. 26, 2010

(54) COMMUNICATION SYSTEM HAVING REDUCED DELAY TIME

(75) Inventors: Jae-hyon Kim, Suwon-si (KR); Young-hwan Kim, Taean-eup (KR); Hyoun kuk Kim, Daejeon (KR); Hyun cheol Park, Daejeon (KR); Seong-soo Lee, Suwon-si (KR); Jae seung Son, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1138 days.

(21) Appl. No.: 11/486,179

(22) Filed: Jul. 14, 2006

(65) Prior Publication Data

US 2007/0124593 A1 May 31, 2007

(30) Foreign Application Priority Data

Nov. 29, 2005 (KR) ...................... 10-2005-0114960

(51) Int. Cl.
*H04L 27/00* (2006.01)

(52) U.S. Cl. .................. 375/295; 375/316; 375/140; 375/146; 375/147; 375/152; 380/255; 380/259; 380/260; 380/263

(58) Field of Classification Search ................ 375/316, 375/295, 140, 146, 147, 152, 150, 142, 143; 380/255, 259, 260, 263
See application file for complete search history.

(56) References Cited

U.S. PATENT DOCUMENTS 7,593,531 B2 * 9/2009 Lau et al. .................... 380/263

OTHER PUBLICATIONS

Soumyajit Mandel and Soumitro Banerjee, "A chaos-based spread spectrum communication system", Dec. 28-30, 2003, National conference on nonlinear systems & dynamics, Indian institute of technology, Kharagpur 721302.*
Geza Kolumban and Zoltab Jako, "Enhanced versions of DCSK and FM-DCSK data transmission systems", 1999, IEEE 0-7803-5471-0/99.*
Wai M. Tam, Francis C.M. Lau, and Chi K. Tse, "Generalized correlation-delay shift keying scheme for non-coherent chaos-based communication systems", 2004, IEEE 0-7803-8251-X/04.*
Yongxiang Xia, Chi K. Tse, Francis C.M. Lau, "Performance of differential chaos-shift-keying digtial communication systems over a multipath fading channel with delay spread", 2004, IEEE 1057-7130/04.*

* cited by examiner

*Primary Examiner*—Chieh M Fan
*Assistant Examiner*—Siu M Lee
(74) *Attorney, Agent, or Firm*—Sughrue Mion, PLLC

(57) ABSTRACT

A communication system includes a transmitter having a signal generator for generating a signal for transmitting data, a transmission delay unit for repeatedly delaying the signal from the signal generator for a predetermined delay time within a symbol period and generating corresponding delayed signals, and a selector for selectively providing one of the delayed signals from the transmission delay unit to an antenna; and a receiver having a reception delay unit for receiving the signal from the transmitter and delaying the signal as long as the delay time of the transmission delay unit, and a data judgment block for discriminating data bits of the signal from the transmitter by comparing the signal from the transmitter with the delayed signal from the reception delay unit. According to the communication system, the delay time can be accurately adjusted even if the delay line is shortened, and the data bits of the communication signal can be accurately judged in the receiver side.

16 Claims, 5 Drawing Sheets

COMMUNICATION SYSTEM HAVING REDUCED DELAY TIME

This application claims priority from Korean Patent Application No. 2005-114960, filed Nov. 29, 2005 in the Korean Intellectual Property Office, the disclosure of which is incorporated herein by reference.

BACKGROUND OF THE INVENTION

1. Field of the Invention

The present invention relates to a communication system having a reduced delay time, and more particularly, to a communication system having a reduced delay time that can provide an accurate delay time of a communication signal using a short delay line and that can accurately judge data bits of the communication signal in a receiver.

2. Description of the Related Art

Generally, a spread spectrum communication is a system for spreading a signal to be transmitted so that the signal has a much wider bandwidth than the original signal and transmitting the spread signal, and a system for transmitting information using a chaotic signal has been recently proposed, in accordance with the IEEE 802.15.4a standard.

The chaotic signal modulation system can be designed by a simple hardwired radio frequency (RF) structure, and does not require a circuit such as a voltage controlled oscillator (VCO), phase locked loop (PLL), mixer, and so on, which are required in existing RF systems. In the case of using the chaotic signal modulation system, the power consumption can be reduced to ⅓ of the power consumption of the conventional system, for example, to 5 mW.

A differential chaos shift keying (DCSK) system may be a representatively used modulation system among various chaotic signal modulation systems.

The DCSK system has the best bit error rate (BER) characteristic among the chaotic signal modulation systems. In the DCSK system that uses a reference signal, two chaotic sample parts that correspond to one data bit are transmitted for each symbol period. The first sample part is used as the reference signal, and the second sample part is used as a data signal to be transmitted. The second sample part is generated by transmitting the reference signal as it is or an inverted reference signal depending on whether a binary symbol being transmitted is "0" or "1". That is, if the binary symbol is "0", the second sample part, which is the data signal, is generated by inverting the reference signal, while if the binary symbol is "1", the data signal is generated by transmitting the reference signal as it is. In a receiver side, the data bits are extracted by processing correlation between the two received sample parts.

FIG. 1 is a block diagram illustrating the construction of a conventional DCSK type communication system. As illustrated in FIG. 1, the communication system includes a transmitter 10 and a receiver 20.

The transmitter 10 includes a chaotic signal generator 11, a multiplier 13, a delay unit 15, and a switch 17. The transmitter 10 carries data on a chaotic signal which is transmitted to the receiver 20.

The chaotic signal generator 11 generates the chaotic signal directly from a frequency band for a data transmission.

The multiplier 13 receives the data bits of "0" or "1" for generating the data, multiplies the data bits by the chaotic signal generated by the chaotic signal generator 11, and provides the result of multiplication to the delay unit 15. If the data bit is "0", the chaotic signal is inverted, and if the data bit is "1", the chaotic signal is maintained as it is.

The delay unit 15 generates a data signal, which is included in the latter half of a symbol period, by delaying the output signal of the multiplier 13 by a half symbol period.

The switch 17 includes a first contact connected to the chaotic signal generator 11 and a second contact connected to the delay unit 15, and generates a signal to be transmitted to the receiver 20 by selecting one of the output signals of the chaotic signal generator 11 and the delay unit 15. The switch 17 alternately switches the first and second contacts under the control of a control unit (not illustrated), and a contact time is set to ½ of a symbol period Ts.

For example, if the switch 17 is switched to the first contact for ½Ts, the reference signal from the chaotic signal generator 11 is output through the switch. Then, if the switch 17 is switched to the second contact, the data signal from the delay unit 15 is output through the switch 17.

By this switch 17, communication signals as shown in FIGS. 2A and 2B are generated. FIG. 2A illustrates a communication signal in the case where the reference signal is the same as the data signal, i.e., the data bit is "1", and FIG. 2B illustrates a communication signal in the case where the data signal is the inverted reference signal, i.e., the data bit is "0".

On the other hand, the receiver 20 includes a delay unit 25, a multiplier 23, a waveform generator 27, and a data judgment unit 29.

The delay unit 25 delays the communication signal input through an antenna as long as the delay time delayed by the delay unit 15 of the transmitter 10, i.e., for ½Ts. This is to judge the data bits by comparing the data signal with the reference signal.

The multiplier 23 multiplies the communication signal input through the antenna by a signal delayed through the delay unit 25, and provides the resultant signal to the waveform generator 27. If the reference signal and the data signal are equal to each other, i.e., if the data bit is "1", a communication signal having twice the energy is output. If the reference signal and the data signal are opposite to each other, i.e., if the data bit is "0", a communication signal having twice the negative energy is output.

The waveform generator 27 removes the chaotic signal and forms the waveform of the communication signal by adding the communication signals output from the multiplier 23 for a predetermined period, i.e., for each symbol period.

The data judgment unit 29 receives the waveform generated by the waveform generator 27, and extracts the data bits from the input waveform. The data judgment unit 29 judges the data bits depending on whether the waveform is higher that a predetermined threshold value, which is set to the energy value of "0". If the waveform is higher than the threshold value, the data judgment unit 29 judges the data bit as "1".I If the waveform is not higher than the threshold value, the data judgment unit 29 judges the data bit as "0".

In order to generate the data signal in the conventional DCSK type communication system, a long delay line for delaying the signal as long as ½Ts should be provided. In addition, it is not easy to accurately perform a delay as long as ½Ts. In the case of comparing the received signal with the delayed signal after the communication signal is delayed as long as ½Ts in the delay unit 25 of the receiver 20, only one comparison is possible for a symbol period since one reference signal and one data signal exist in a symbol period. Accordingly, if a multi-path reception of a noise or a communication signal occurs, the waveform output from the waveform generator 27 has an energy value that is lower than the threshold value although the signal output from the transmitter 10 is "1", and this may cause the data bit to be judged as "0". By contrast, if the waveform output from the waveform generator 27 has an energy value that is higher than the threshold value although the signal output from the transmitter 10 is "0", the data bit may be judged as "1".

Accordingly, a method is needed for not only providing an accurate delay time of the communication signal through the delay unit 15 but also shortening the delay line. In addition, it is required to provide a method for more accurately judging the data bits for each symbol period in the receiver side.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides a communication system having a reduced delay time that can provide an accurate delay time of a communication signal using a short delay line and that can reduce the delay time for accurately judging data bits of the communication signal in a receiver.

According to an aspect of the present invention, there is provided a communication system having a reduced delay time, which comprises a transmitter that includes a signal generator for generating a signal for transmitting data, a transmission delay unit for repeatedly delaying the signal from the signal generator for a predetermined delay time within a symbol period and generating corresponding delayed signals, and a selector for selectively providing one of the delayed signals from the transmission delay unit to an antenna.

The signal generator may be a chaotic signal generator for generating a chaotic signal.

The selector may be a first switch that has a first contact connected to the signal generator and a second contact connected to the transmission delay unit.

The communication system may further include a first multiplier for multiplying the signal generated from the signal generator by a data bit that is a binary symbol of the data and generating a data signal.

The communication system may further include a delay feedback loop for re-inputting the signal having been delayed through the transmission delay unit to the transmission delay unit, and a second multiplier, installed on the delay feedback loop, for multiplying the signal by the same data bit as that input to the first multiplier.

The communication system may further include a second switch having a first contact connected to the first multiplier and a second contact connected to the second multiplier, and installed between the transmission delay unit and the first and second multipliers, for selectively providing the signal from the first multiplier or the second multiplier to the transmission delay unit.

The transmission delay unit may delay the signal as long as ½n of a symbol period.

The transmission delay unit may repeat the delay of the signal 2n−1 times within a symbol period.

The first and second switches may be respectively switched to their first contacts for a delay time corresponding to the first ½n of the symbol period, and may be respectively switched to their second contacts for the remaining time of the symbol period.

The signal generator may be an impulse generator for generating an impulse signal.

The communication system may further comprises a receiver that includes a reception delay unit for receiving the signal from the transmitter and delaying the signal as long as the delay time of the transmission delay unit, and a data judgment block for discriminating data bits of the signal from the transmitter by comparing the signal from the transmitter with the delayed signal from the reception delay unit.

The data judgment block may include a multiplier for multiplying the signal from the transmitter by the delayed signal from the reception delay unit, and providing a plurality of signal values with respect to the symbol period, a waveform generator for generating waveforms with respect to the respective signal values output from the multiplier, and a data judgment unit for judging the data bits for the respective symbol periods according to the waveforms of the respective signal values generated by the waveform generator.

The number of signal values output from the multiplier may be 2n−1 for one symbol period.

The receiver may further includes a bit judgment unit for judging the data bits of the respective signals depending on whether the waveforms of the respective signal values generated by the waveform generator exceed a predetermined threshold value, and providing the result of judgment to the data judgment unit.

The data judgment unit may judge the data bits of the symbol period according to the number of data bits of the respective signal values included in one symbol period, that are judged by the bit judgment unit.

The data judgment unit may judge the data bits depending on whether a sum of the respective signal values included in one symbol period exceeds a predetermined threshold value.

According to another aspect of the present invention, there is provided a communication system having a reduced delay time, which comprises a transmitter that includes a signal generator for generating a signal for transmitting data, a transmission delay unit for repeatedly delaying the signal from the signal generator for a predetermined delay time within a symbol period and generating corresponding delayed signals, and a selector for selectively providing one of the delayed signals from the transmission delay unit to an antenna; and a receiver that includes a reception delay unit for receiving the signal from the transmitter and delaying the signal as long as the delay time of the transmission delay unit, and a data judgment block for discriminating data bits of the signal from the transmitter by comparing the signal from the transmitter with the delayed signal from the reception delay unit.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
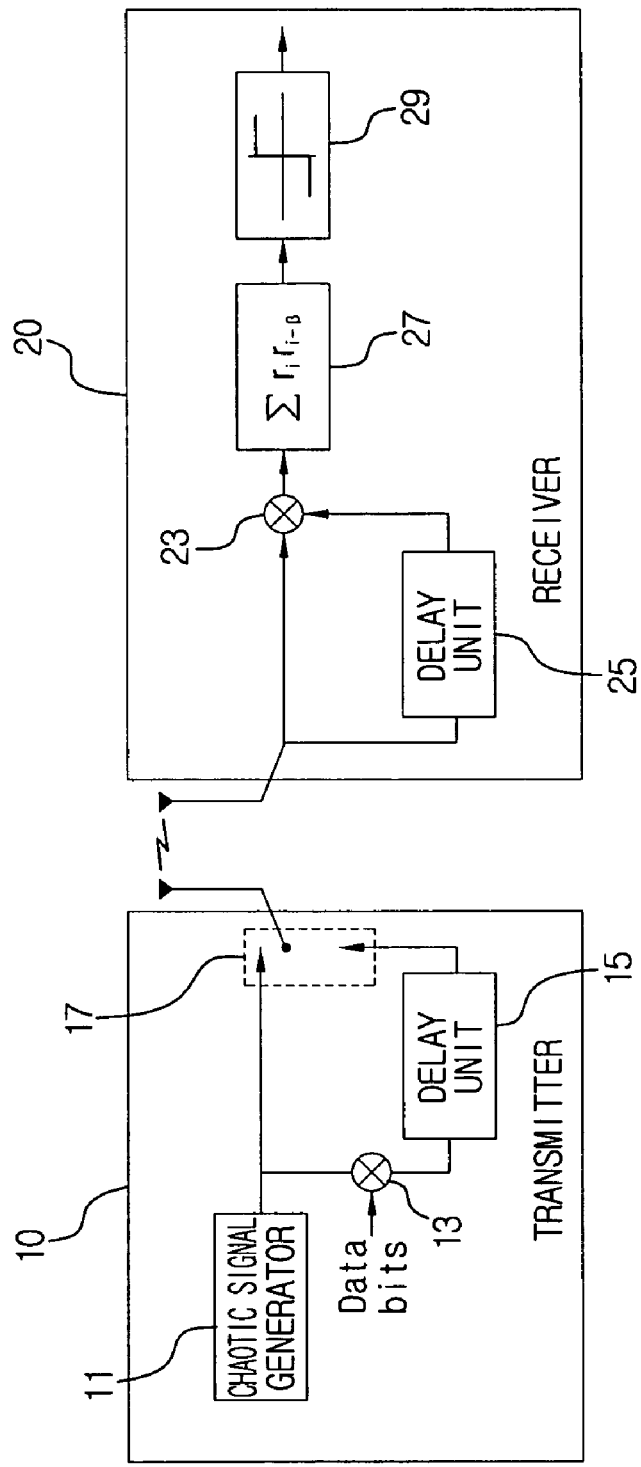
FIG. 1 is a block diagram illustrating the construction of a conventional DCSK type communication system.
Figure 2A:
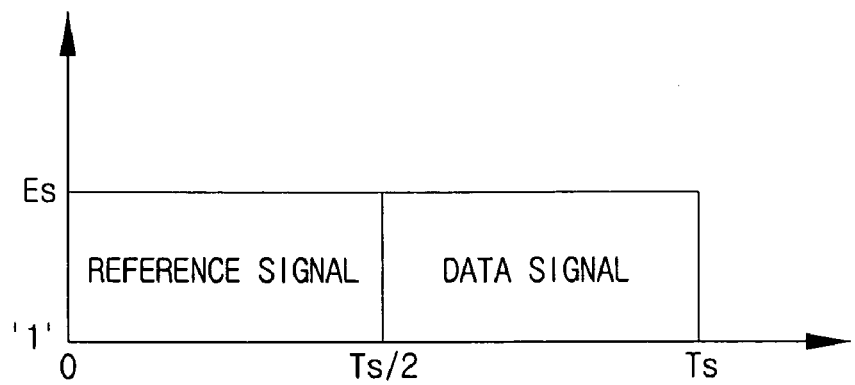
FIGS. 2A and 2B are waveform diagrams of communication signals generated by a conventional DCSK type transmitter.
Figure 2B:
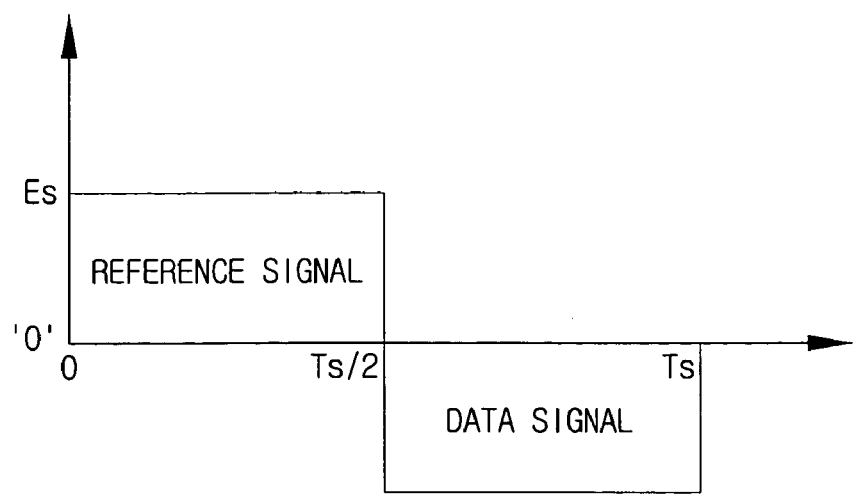

Certain exemplary embodiments of the present invention will be described in greater detail with reference to the accompanying drawings. In the description of the exemplary embodiments of the present invention, the same drawing reference numerals are used for the same elements in various figures. The conventional elements or their detailed description will be omitted if it is determined that they impede the subject matter of the present invention.

Figure 3:
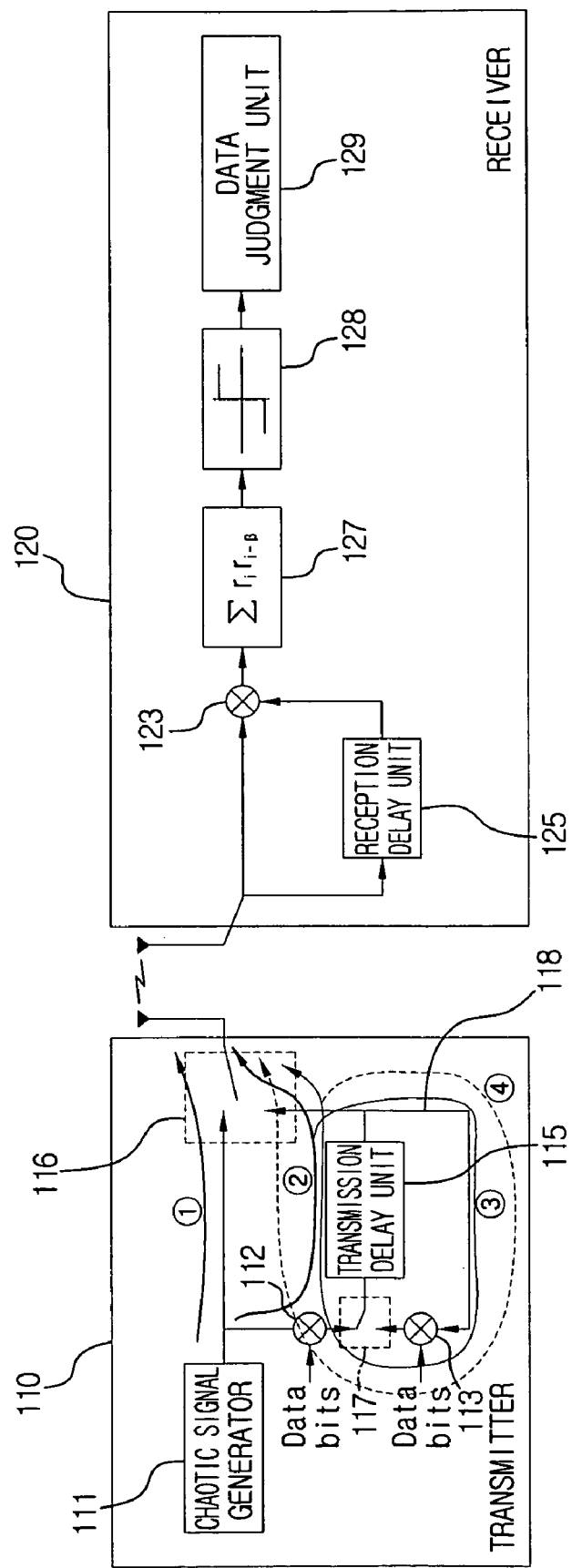
FIG. 3 is a block diagram illustrating the construction of a DCSK type communication system according to an exemplary embodiment of the present invention.

FIG. 3 is a block diagram illustrating the construction of a DCSK type communication system according an exemplary embodiment to the present invention.

As illustrated in FIG. 3, the communication system according to the present invention includes a transmitter 110 and a receiver 120.

The transmitter 110 includes a chaotic signal generator 111, a first multiplier 112, a transmission delay unit 115, a delay feedback loop 118, a second multiplier 113, a first switch 116, and a second switch 117, and carries data on a chaotic signal to transmit the data carried on the chaotic signal to the receiver 120.

The chaotic signal generator 111, which generally uses a chaotic dynamic system, generates the chaotic signals having a specified characteristic for a data transmission. This chaotic signal generator 111 generates the chaotic signals directly from frequency bands for the data transmission, such as predetermined RF signals, microwaves, infrared rays, and visible rays.

The first multiplier 112 receives data bits of "0" or "1" for generating data, multiplies the data bits by the chaotic signal generated by the chaotic signal generator 111, and provides the result of multiplication to the transmission delay unit 115. If the data bit is "0", the chaotic signal is inverted, and if the data bit is "1", the chaotic signal is maintained as it is.

The second multiplier 113 multiplies the delayed signal from the transmission delay unit 115 by the same data bit as that of the first multiplier 112.

The delay feedback loop 118 adds the data bit provided from the second multiplier 113 to the delayed signal from the transmission delay unit 115, and provides the added signal to the transmission delay unit 115 again.

The transmission delay unit 115 generates a data signal by delaying the signal generated from the first multiplier 112 as long as ½n of the symbol period T. Here, if n is larger than 2, i.e., if n is T/4, T/6, T/8, and others, the transmission delay unit 115 alternately generates a data signal and a reference signal by delaying the signal having passed through the delay feedback loop 118 for ½n of the symbol period.

For example, if the delay time is T/4, the reference signal is transmitted through an antenna in the process indicated as ① in FIG. 3, and the transmission delay unit 115 generates the data signal by delaying the reference signal processed by the first multiplier 112 according to the data bit for T/4 in the process indicated as ② in FIG. 3. In this case, if the data bit is "1", the data signal generated by the transmission delay unit 115 is equal to the reference signal. The generated data signal is provided to the first switch 116, and is simultaneously looped back via the delay feedback loop 118 to the second multiplier 113 to be multiplied by the data bit and provided again to the transmission delay unit 115, in the process indicated as ③ in FIG. 3. In this case, the data bit provided to the second multiplier 113 is equal to the data bit provided to the first multiplier 112. The transmission delay unit 115 generates the reference signal by delaying the input data signal for T/4. The generated reference signal is provided to the first switch 116, and is simultaneously provided to the transmission delay unit 115 after being processed by the second multiplier 113 through the delay feedback loop 118, in the process indicated as ④ in FIG. 3. The transmission delay unit 115 generates the data signal by delaying again the reference signal for T/4.

Figure 4A:
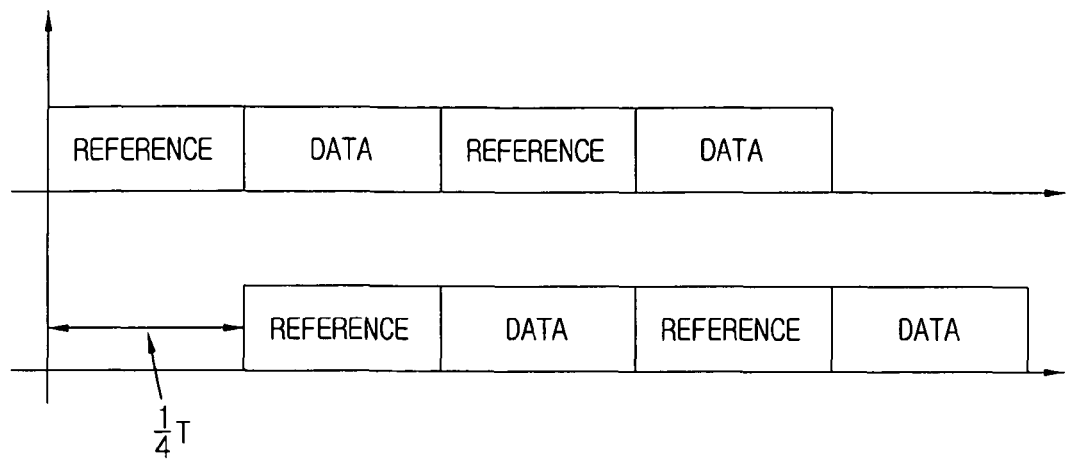
FIGS. 4A to 4C are exemplary waveform diagrams of communication signals generated by the transmitter in the case where delay times are T/4, T/6, and T/8, respectively.

Accordingly, if the delay time is T/4, the reference signal provided to the transmission delay unit 115 is converted into a data signal, and a pair of the reference signal and the data signal is further generated by twice performing the delay process through the delay feedback loop 118. That is, as illustrated in FIG. 4A, two pairs of data signals and reference signals are carried in one symbol period, and numerals marked on the respective signals indicate the signals generated through the respective processes of ①, ②, ③, and ④ in FIG. 3.

Figure 4B:
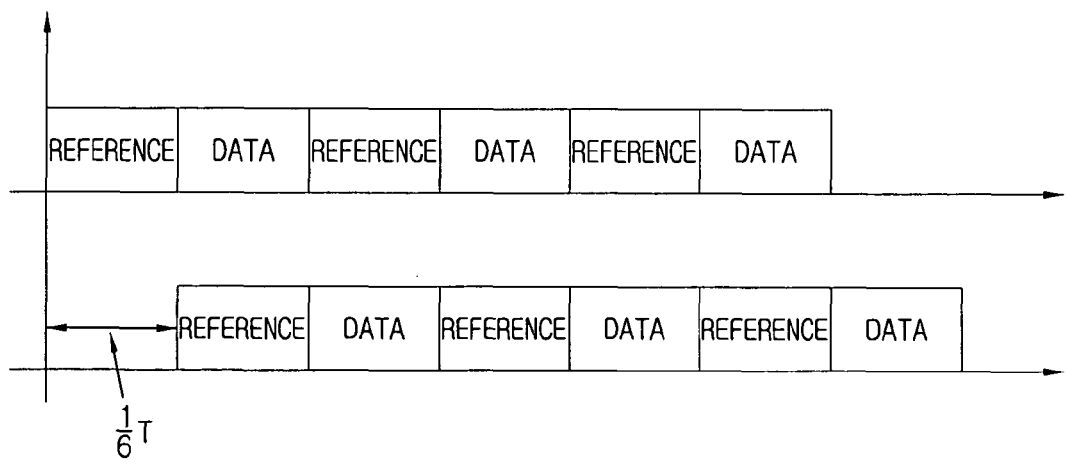
Figure 4C:
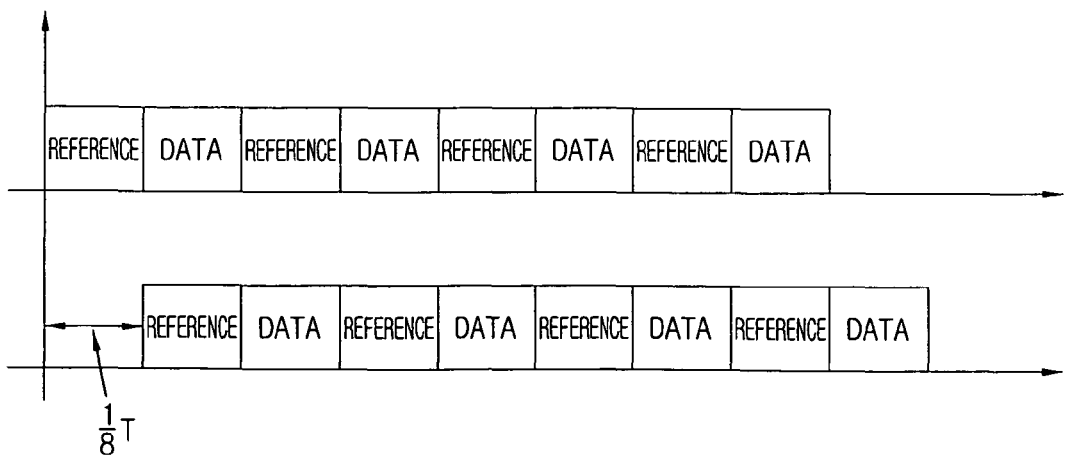

In the same manner, if the delay time is T/6, three pairs of data signals and reference signals are carried in one symbol period as illustrated in FIG. 4B, and if the delay time is T/8, four pairs of data signals and reference signals are carried in one symbol period as illustrated in FIG. 4C.

The first switch 116, which is installed between the chaotic signal generator 111 and the transmission delay unit 115, selects and provides one of the signals from the chaotic signal generator 111 and the transmission delay unit 115 to the antenna. The first switch 116 includes a first contact connected to the chaotic signal generator 111 and a second contact connected to the transmission delay unit 115. The first switch 116 is alternately switched between the first contact and the second contact under the control of a control unit (not illustrated), and the time which the first switch 116 is switched to the respective contacts is determined according to the delay time. If the delay time is T/4, the first switch 116 is switched to the first contact for the first T/4 of the symbol period, and is switched to the second contact for the remaining amount of the symbol period. If the delay time is T/6, the first switch 116 is switched to the first contact for the first T/6 of the symbol period, and then is switched to the second contact for the remaining symbol period. That is, the first switch 116 is switched over to the first contact only for the delay time in the symbol period, and then is switched to the second contact for the remaining time of the symbol period.

The second switch 117, which is installed between the first multiplier 112 and the second multiplier 113, selectively provides the signals from the first multiplier 112 and the second multiplier 113 to the transmission delay unit 115. The second switch 117 has a first contact connected to the first multiplier 112 and the second contact connected to the second multiplier 113. In the same manner as the first switch 116, the second switch 117 is alternately switched between the first contact and the second contact according to the delay time. The second switch 117 is switched to the first contact for the delay time in the symbol period, and provides the signal from the chaotic signal generator 111 to the transmission delay unit 115, while it is switched to the second contact for the remaining time of the symbol period, and provides the delayed signal from the transmission delay unit 115 to the transmission delay unit 115 again.

On the other hand, the receiver 120 includes a reception delay unit 125, a multiplier 123, a waveform generator 127, a bit judgment unit 128, and a data judgment unit 129.

The reception delay unit 125 delays the communication signal input through an antenna as long as the delay time delayed by the transmission delay unit 115 of the transmitter 110, i.e., for ½n of the symbol period T. Accordingly, the delayed signal having passed through the reception delay unit 125 is delayed as long as ½n of the symbol period T in comparison to the signal input through the antenna.

The multiplier 123 multiplies a communication signal delayed by the reception delay unit 125 by a communication signal input through the antenna, and provides the resultant signal to the waveform generator 127. At this time, the multiplier 123 multiplies the n-th reference signal or data signal of the communication signal from the antenna by the (n−1)-th data signal or reference signal of the communication signal from the reception delay unit 125. In other words, the multiplier 123 multiplies 2n−1 signal pairs.

For example, if the delay time is T/4, the multiplier 123 multiplies the first data signal of the communication signal from the antenna by the first reference signal of the communication signal delayed by the reception delay unit 125, and multiplies the second reference signal of the communication signal from the antenna by the first data signal of the communication signal from the reception delay unit 125. Also, the multiplier 123 multiplies the second data signal of the communication signal from the antenna by the second reference signal of the communication signal from the reception delay unit 125. Accordingly, three signal pairs are multiplied. In the same manner, if the delay time is T/6, five signal pairs are multiplied, and if the delay time is T/8, seven signal pairs are multiplied, respectively.

If the reference signal and the data signal are equal to each other, i.e., if the data bit is "1", the communication signal having twice the energy is output. If the reference signal and the data signal are opposite to each other, i.e., if the data bit is "0", the communication signal having twice the negative energy is output.

The waveform generator 127 removes the chaotic signal and forms the waveform of the communication signal by calculating averages of the resultant values of the multiplication of the signal pairs in a specified period, for example, a symbol period, with respect to the communication signals output from the multiplier 123.

The bit judgment unit 128 receives the waveforms generated by the waveform generator 127, and extracts data bits for the respective signal pairs. At this time, the data bits are judged depending on whether the waveform is larger than a predetermined threshold value. If the waveform is larger than "0" that is the threshold value, the bit judgment unit 128 judges the data bit as "1". If the waveform is not larger than the threshold value, the bit judgment unit 128 judges the data bit as "0". Since the data bit is produced for each signal pair, a plurality of data bits are extracted for each symbol period. For example, in the case of the communication signal having a delay time of T/4, three signal pairs are produced, and thus three data bits are extracted. In the case of the communication signal having a delay time of T/6, five data bits are extracted, and in the case of the communication signal having a delay time of T/8, seven data bits are extracted.

The data judgment unit 129 judges the data bits of the respective symbol periods based on the data bits of the respective signal pairs judged by the bit judgment unit 128. That is, the data judgment unit 129 judges the data bits that command a majority between the data bits of "0" and "1" included in a symbol period as the data bits of the respective symbol periods. For example, in the case of the communication signal having the delay time of T/4, if the data bits of three signal pairs in a symbol period are all "1", the data judgment unit 129 judges the data bit of the corresponding symbol period as "1". If two data bits are "1" and one data bit is "0" among the data bits of the three signal pairs, the data judgment unit 129 judges that the data bit of the corresponding symbol period as "1". However, if one data bit is "1" and two data bits are "0" among the data bits of the three signal pairs, the data judgment unit 129 judges the data bit of the corresponding symbol period as "0".

A process of transmitting/receiving a chaotic signal in the communication system as constructed above in the case where the delay time is T/4 will now be explained.

The chaotic signal generated by the chaotic signal generator 111 of the transmitter 110 is provided to the first contact of the first switch 116 and the first multiplier 112. The first switch 116 is switched to the first contact for T/4 of the corresponding symbol period, and the chaotic signal having passed through the first switch 116 is transmitted to the receiver 120 through the antenna as the reference signal. After the delay time of T/4, the first switch 116 is switched to the second contact for the remaining time of the corresponding symbol period.

The chaotic signal provided to the first multiplier 112 is multiplied by the data bit, for example, "1", and the multiplied signal is provided to the transmission delay unit 115. The transmission delay unit 115 delays the chaotic signal for T/4, i.e., the predetermined delay time. The delayed chaotic signal is provided to the first switch 116 and the delay feedback loop 118, and the chaotic signal provided to the first switch 116 is transmitted to the receiver 120 through the antenna.

The second multiplier 113 multiplies the chaotic signal provided by the delay feedback loop 118 by "1", i.e., the same data bit input to the first multiplier 112, and then the chaotic signal delayed for T/4 by the transmission delay unit 115. This chaotic signal is a 2T/4-delayed signal in comparison to the chaotic signal generated by the chaotic signal generator 111, and is provided to the first switch 116 and the delay feedback loop 118. In this case, the chaotic signal provided to the first switch 120 is provided to the receiver 120 through the antenna as the reference signal.

The chaotic signal provided to the delay feedback loop 118 is multiplied by the data bit of "1" through the second multiplier 113, delayed for T/4 by the transmission delay unit 115, and then provided to the first switch 116. The chaotic signal provided to the first switch 116 is a 3T/4-delayed signal in comparison to the chaotic signal generated by the chaotic signal generator 111, and is provided to the receiver 120 through the antenna as the data signal.

If four chaotic signals, i.e., a pair of reference signals and a pair of data signals, are carried within one symbol, the first switch 116 is again switched to its first contact, and the second switch 117 is also switched to its first contact.

On the other hand, if the communication signal is received in the receiver 120, the reception delay unit 125 delays the input communication signal for T/4, and the multiplier 123 multiplies the communication signal input through the antenna by the communication signal delayed by the reception delay unit 125. At this time, three signal pairs are produced by multiplying the delayed communication signal by the non-delayed communication signal with respect to one symbol period. The waveform generator 127 generates the waveform by averaging the respective signal pairs, and the bit judgment unit 128 judges the data bits of the respective signal pairs. Then, the data judgment unit 129 judges the data bit of the corresponding symbol period using the number of data bits of the respective signal pairs.

Figure 5:
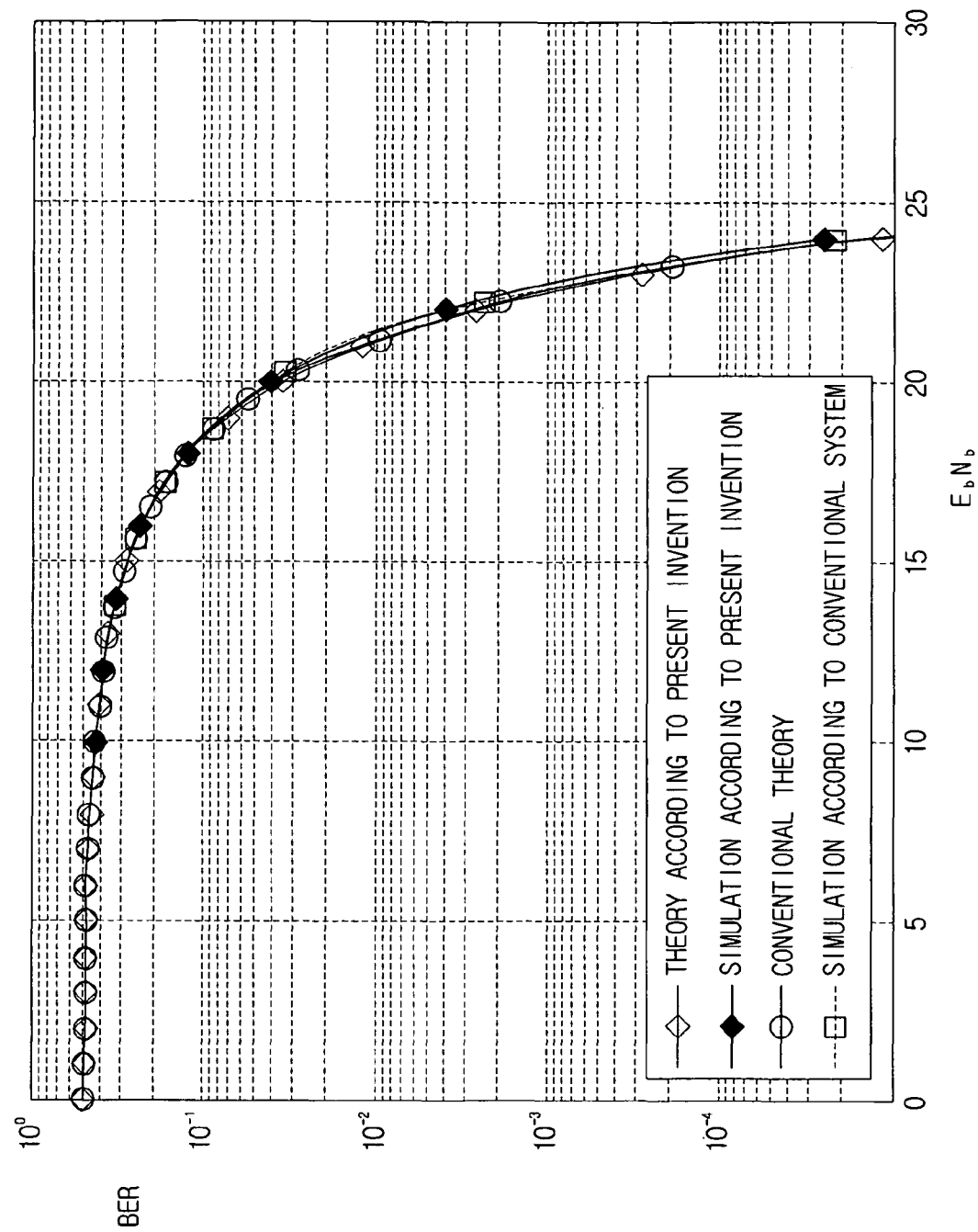
FIG. 5 is a graph illustrating simulation results of the performance of the DCSK type communication system according to an exemplary embodiment of the present invention.

FIG. 5 is a graph illustrating simulation results of the performance of the DCSK type communication system according to the present invention.

The simulation condition is AWGN channel, 2.5 Mbps, and sampling frequency of 16 GHz. As illustrated in FIG. 5, comparing the DCSK system according to the present invention with the conventional DCSK system on the basis of BER $10^{-3}$, it can be recognized that their performances are almost the same.

As described above, according to the communication system according to the present invention, a delay feedback loop 118 is provided, and plural pairs of reference signals and data signals are carried in one symbol period through several signal delay processes performed by the transmission delay unit 115. Accordingly, the delay time can be accurately adjusted without the necessity of a long physical delay line, and accurate data bits can be obtained since the judgment of the data bits is performed several times with respect to one symbol period in the receiver side.

In the exemplary embodiment of the present invention, it is exemplified that the bit judgment unit 128 judges the data bits for the respective signal pairs, and then the data judgment unit 129 judges the data bit of the corresponding symbol period using the number of data bits of the respective signal pairs. However, a soft decision method may be used, which judges the data bits by directly providing the waveform obtained by averaging the respective signal pairs from the waveform generator 127 to the data judgment unit 129 without installing the bit judgment unit 128. In this method, the data judgment unit 129 adds the waveforms of the respective signal pairs, and if the sum of the waveforms is larger than a specified threshold value of "0", it judges the data bit as "1", while if the sum of the waveforms is not larger than the threshold value of "0", it judges that the data bit as "0".

Also, in the exemplary embodiment of the present invention, the DCSK system using the chaotic signal is exemplified. However, it will be apparent that the present invention can be applied to an impulse system for transmitting a communication signal using a pulse signal to obtain the same effect. In the case where the present invention is applied to the impulse system, the above-described DCSK system is prepared in the same manner, and an impulse radio generator is used instead of the chaotic signal generator 111. In the case of applying the present invention to the impulse system, however, the width of the impulse should be smaller than the delay time of the transmission delay unit 115.

As described above, according to the present invention, the delay time can be accurately adjusted even if the delay line is shortened, and the data bits of the communication signal can be accurately judged in the receiver side.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A transmitter comprising:
a signal generator which generates a signal for transmitting data;
a transmission delay unit which repeatedly delays the signal generated by the signal generator modified by a data bit for a predetermined delay time within a symbol period;
a delay feedback loop which loops back a delayed signal outputted by the transmission delay unit to the transmission delay unit in order to generate a plurality of delayed signals; and
a selector which outputs the signal generated by the signal generator and each of the plurality of the delayed signals sequentially.

2. The transmitter as claimed in claim 1, wherein the signal generated by the signal generator is a chaotic signal.

3. The transmitter as claimed in claim 1, wherein the selector comprises a first switch having a first position which connects the signal generated by the signal generator to an antenna and a second position which connects the signal generated by the transmission delay unit to the antenna.

4. The transmitter as claimed in claim 3, further comprising a first multiplier which multiplies the signal generated by the signal generator by the data bit that is a binary symbol of the data to generate a data signal.

5. The transmitter as claimed in claim 4, further comprising a second multiplier, wherein the delay feedback loop provides the delayed signals generated by the transmission delay unit to the second multiplier, wherein the second multiplier multiplies the delayed signals by the same data bit as that input to the first multiplier.

6. The transmitter as claimed in claim 5, further comprising a second switch having a first position which connects the multiplied signal generated by the first multiplier to the transmission delay unit, and a second position which connects the multiplied signals generated by the second multiplier to the transmission delay unit.

7. The transmitter as claimed in claim 6, wherein the transmission delay unit delays the signal as long as $\frac{1}{2}n$ of a symbol period, where n is an integer.

8. The transmitter as claimed in claim 7, wherein the transmission delay unit repeatedly delays the signal $2n-1$ times within the symbol period.

9. The transmitter as claimed in claim 7, wherein the first and second switches are respectively switched to their first positions for a delay time corresponding to a first $\frac{1}{2}n$ of the symbol period, and are respectively switched to their second positions for the remaining amount of the symbol period.

10. The transmitter as claimed in claim 1, wherein the signal generated by the signal generator is an impulse signal.

11. A communication system comprising:
transmitter which comprises:
a signal generator which generates a signal for transmitting data;
a transmission delay unit which repeatedly delays the signal generated by the signal generator modified by a data bit for a predetermined delay time within a symbol period;
a delay feedback loop which loops back a delayed signal outputted by the transmission delay unit to the transmission delay unit in order to generate a plurality of delayed signals; and
a selector which outputs the signal generated by the signal generator and each of the plurality of the delayed signals sequentially; and
a receiver which comprises:
a reception delay unit which receives the selected signal from the transmitter and delays the selected signal received from the transmitter as long as the delay time of the transmission delay unit to generate a delayed signal; and
a data discrimination unit which discriminates data bits of the signal received from the transmitter by comparing the signal received from the transmitter with the delayed signal generated by the reception delay unit.

12. The communication system as claimed in claim 11, wherein the data discrimination unit comprises:
a multiplier which multiplies the signal received from the transmitter by the delayed signal generated by the reception delay unit, and provides a plurality of signal values with respect to the symbol period;

a waveform generator which generates waveforms with respect to the respective signal values output from the multiplier; and a data judgment unit which judges the data bits for the respective symbol periods according to the waveforms of the respective signal values generated by the waveform generator.

13. The communication system as claimed in claim 12, wherein a number of signal values output from the multiplier is 2n−1 for one symbol period, where n is an integer.

14. The communication system as claimed in claim 12, wherein the receiver further comprises a bit judgment unit which judges the data bits of the respective signals depending on whether the waveforms of the respective signal values generated by the waveform generator exceed a predetermined threshold value, and provides a result of judgment to the data judgment unit.

15. The communication system as claimed in claim 14, wherein the data judgment unit judges the data bits of the symbol period according to a number of data bits of the respective signal values included in one symbol period, that are judged by the bit judgment unit.

16. The communication system as claimed in claim 12, wherein the data judgment unit judges the data bits depending on whether a sum of the respective signal values included in one symbol period exceeds a predetermined threshold value.

* * * * *